US011574129B2

(12) United States Patent
Chikoti et al.

(10) Patent No.: US 11,574,129 B2
(45) Date of Patent: Feb. 7, 2023

(54) SYSTEMS AND METHODS FOR GENERALIZED STRUCTURED DATA DISCOVERY UTILIZING CONTEXTUAL METADATA DISAMBIGUATION VIA MACHINE LEARNING TECHNIQUES

(71) Applicant: JPMORGAN CHASE BANK, N.A., New York, NY (US)

(72) Inventors: Santosh Chikoti, Monroe Township, NJ (US); Jeffrey Kessler, Mahopac, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 336 days.

(21) Appl. No.: 17/010,023

(22) Filed: Sep. 2, 2020

(65) Prior Publication Data
US 2022/0067294 A1 Mar. 3, 2022

(51) Int. Cl.
*G06F 40/30* (2020.01)
*G06F 40/205* (2020.01)
*G06F 16/2457* (2019.01)
*G06F 40/253* (2020.01)
*G06N 20/00* (2019.01)

(52) U.S. Cl.
CPC ........ *G06F 40/30* (2020.01); *G06F 16/24573* (2019.01); *G06F 40/205* (2020.01); *G06F 40/253* (2020.01); *G06N 20/00* (2019.01)

(58) Field of Classification Search
CPC .. G06F 40/30; G06F 16/24573; G06F 40/205; G06F 40/253; G06F 16/3344; G06N 20/00
See application file for complete search history.

(56) References Cited

U.S. PATENT DOCUMENTS

| | | | | |
|---|---|---|---|---|
| 10,290,003 B1 * | 5/2019 | Hammad | ............. | G06Q 20/425 |
| 10,311,402 B1 * | 6/2019 | Mathwig | ................ | G06Q 10/10 |
| 11,449,676 B2 * | 9/2022 | Reddi | .................... | G06F 16/215 |
| 11,449,842 B2 * | 9/2022 | Baldet | .................. | G06Q 20/065 |
| 2002/0133514 A1 * | 9/2002 | Bates | .................... | G06F 40/268 |
| | | | | 707/E17.115 |

(Continued)

*Primary Examiner* — Akwasi M Sarpong
(74) *Attorney, Agent, or Firm* — Greenberg Traurig LLP (57) ABSTRACT

A method for generalized structured data discovery may include (1) receiving physical application metadata from data sources for an attribute, a database object, or a database; (2) receiving reference data comprising a plurality of tokens and their associated abbreviations/acronyms; (3) parsing the physical application metadata into a application tokens comprising known and unknown application tokens; (4) identifying unknown application tokens by comparing the parsed application tokens to a corpus; (5) performing probabilistic parsing on the unknown application tokens using the reference data; (6) performing bi-directional encoding to expand the polysemous tokens to relevant expressions using the reference data; (7) applying language tokens to the relevant expressions in the expanded polysemous tokens to disambiguate the relevant expressions; and (8) outputting a mapping of the physical application metadata to enhanced physical application metadata, wherein the enhanced physical application metadata comprises an expression for the physical application metadata in a supported language.

18 Claims, 2 Drawing Sheets

(56) References Cited

U.S. PATENT DOCUMENTS

| | | | |
|---|---|---|---|
| 2002/0180807 A1* | 12/2002 | Dubil | H04N 21/42204 348/E5.103 |
| 2012/0072204 A1* | 3/2012 | Nasri | G06F 40/253 704/260 |
| 2014/0032584 A1* | 1/2014 | Baker | G09G 5/14 715/765 |
| 2015/0186363 A1* | 7/2015 | Vashishtha | G06F 40/253 707/755 |
| 2018/0082032 A1* | 3/2018 | Allen | G16H 40/63 |
| 2019/0043500 A1* | 2/2019 | Malik | G10L 15/1815 |
| 2019/0236131 A1* | 8/2019 | Allen | G06F 40/30 |

* cited by examiner

SYSTEMS AND METHODS FOR GENERALIZED STRUCTURED DATA DISCOVERY UTILIZING CONTEXTUAL METADATA DISAMBIGUATION VIA MACHINE LEARNING TECHNIQUES

BACKGROUND OF THE INVENTION

1. Field of the Invention

Embodiments are generally related to systems and methods for generalized structured data discovery utilizing contextual metadata disambiguation via machine learning techniques.

2. Description of the Related Art

Large multi-national enterprises own a large number of applications and databases collected over the years through acquisition and driven by continuously changing business requirements. Each of these applications have been built using a highly optimized language tuned for the specific business problem they were created to solve. In the past, the user community of an application and dataset were known, and any ambiguity around data structures, sensitivity, and regulations were handled by the application developers.

In the past decade, there has been a heightened regulatory environment. Combined with data migrating to data lakes, clouds, and machine learning projects, there are many new stakeholders both inside and outside of the organization who need to understand data in order to make decisions. Some examples include: is any of the data in the dataset sensitive; where is data of a given type being produced and consumed; how is the data moving through the organization or out of the organization; does the organization maintain duplicates of the same data; is the data subject to legal hold or record retention regulations; how does the organization shed light on "dark pools" of data which could be critical to further business objectives; etc.

In the past, data profiling products have been used to reverse engineer data sets in order to document them for data sensitivity, regulatory asks, and for efficiency. The sheer volume of data involved makes this approach impractical for large organizations, as it is not unusual for there to be tens of thousands of databases representing petabytes of data. Using a deep profiling tool, it would take over a decade to comprehensively process this much data. Even worse, by the time the profiling exercise was complete, the underlying data would have changed to such an extent that the inventory would have little ongoing value.

Due to these challenges, organizations have relied on application owners to manually certify their data periodically from stored documentation, models, and source code. The challenges with the "manual method" is consistency, freshness, and compliance. It is risky to have many different application owners interpreting constantly changing privacy standards. In addition, application teams change and evolve over time, new members of the team may not even realize what they are certifying. Over time "dark pools" of data develop. Lastly, application teams are very busy solving business problems and may feel pressure to place compliance tasks onto the backlog.

SUMMARY OF THE INVENTION

Systems and methods for generalized structured data discovery utilizing contextual metadata disambiguation via machine learning techniques are disclosed. According to one embodiment, in an information processing apparatus comprising at least one computer processor, a method for generalized structured data discovery utilizing contextual metadata disambiguation via machine learning techniques may include: (1) receiving physical application metadata from one or more data sources for an attribute, a database object, or a database; (2) receiving reference data comprising a plurality of tokens and their associated abbreviations and acronyms; (3) parsing the physical application metadata into a plurality of application tokens comprising known application tokens and unknown application tokens; (4) identifying unknown application tokens by comparing the parsed application tokens to a corpus; (5) performing probabilistic parsing on the unknown application tokens using the reference data; (6) performing bi-directional encoding on polysemous unknown application tokens to expand the polysemous tokens to relevant expressions using the reference data; (7) applying language tokens to the relevant expressions in the expanded polysemous tokens to disambiguate the relevant expressions; and (8) outputting a mapping of the physical application metadata to enhanced physical application metadata, wherein the enhanced physical application metadata comprises an expression for the physical application metadata in a supported language.

In one embodiment, the method may further include performing neural machine translation on unknown application tokens in an unsupported language to translate the unknown application tokens to the supported language.

In one embodiment, the metadata may be received from a plurality of data sources.

In one embodiment, the parsing may eliminate special characters and/or remove stop words.

In one embodiment, the parsing may be based on common delimiters.

In one embodiment, the corpus may include a dictionary for the supported language, the reference data, etc.

In one embodiment, the reference data may include common industry and organization terms.

In one embodiment, the language tokens may be applied to the relevant expressions in the expanded polysemous tokens using a left and right-side encoding/context model.

According to another embodiment, a system for generalized structured data discovery utilizing contextual metadata disambiguation via machine learning techniques may include a plurality of data sources of physical application metadata for an attribute, a database object, or a database; at least one organizational database comprising reference data comprising a plurality of tokens and their associated abbreviations and acronyms; and a language processing engine comprising at least one computer processor in communication with the plurality of data sources. The language processing engine may receive the physical application metadata from the data sources; receive the reference data from the organizational database; parse the physical application metadata into a plurality of application tokens comprising known application tokens and unknown application tokens; identify unknown application tokens by comparing the parsed application tokens to a corpus; perform probabilistic parsing on the unknown application tokens using the reference data; perform bi-directional encoding on polysemous unknown application tokens to expand the polysemous tokens to relevant expressions using the reference data; apply language tokens to the relevant expressions in the expanded polysemous tokens to disambiguate the relevant expressions; and output a mapping of the physical application metadata to enhanced physical application metadata, wherein the enhanced physical application metadata may include an expression for the physical application metadata in a supported language.

In one embodiment, the language processing engine may perform neural machine translation on unknown application tokens in an unsupported language to translate the unknown application tokens to the supported language.

In one embodiment, the metadata may be received from a plurality of data sources.

In one embodiment, the parsing may eliminate special characters and/or remove stop words.

In one embodiment, the parsing may be based on common delimiters.

In one embodiment, the corpus may include a dictionary for the supported language. In one embodiment, the corpus may include reference data.

In one embodiment, the reference data may include common industry and organization terms.

In one embodiment, the language tokens may be applied to the relevant expressions in the expanded polysemous tokens using a left and right-side encoding/context model.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments generally relate to systems and methods for generalized structured data discovery utilizing contextual metadata disambiguation via machine learning techniques. To address the speed, scale, and scope issues described above, embodiments are directed to a human-readable dictionary of structured data in a data store by collecting and processing metadata instead of profiling data values. Specifically, embodiments may collect attributes, database objects, and databases. Examples may include schemas, tables, column names, and associated metadata including data types and sizes. Benefits may include at least some of the following: (1) a substantially smaller dataset to work with (e.g., gigabytes instead of petabytes); (2) rapid collection of the entire estate allows frequent refreshes; and (3) small overhead on target data servers and minimal hardware in the central tool.

Embodiments make the following assumptions: (1) Developers used some type of logic when naming database objects (e.g., relatively infrequent usage of object names like col1/col2); (2) data values in a column can be ambiguous—a column called "account" may hold multiple account number types which may look radically different (profilers relying on "regEx" rules get confused very quickly); (3) metadata labels concatenated together can be reliably parsed into standardized tokens (e.g., "acctno" may be expanded to "Account Numbers"). A parsing and abbreviation expansion step may be used; (4) while different development groups may call the same object different names, the names may be standardized into a canonical form as people do this every day in normal conversation (e.g., Client, Party, Customer, etc.); (5) issues like foreign languages, misspelling in metadata (e.g., different spellings for UK and US English) may be mitigated; (6) abbreviations may be expanded, and ambiguous abbreviations used in metadata labels may be resolved based on the context in which an element sits (e.g., 'CA_ID' column could mean 'Client Advisor ID' in one app and 'Client Associate ID' in another application)

Embodiments may "Englishify" physical metadata. This process may propose a human readable "phrase" for every piece of physical metadata, including database objects such as table and column names. This "Englishified" data assists with understanding the data and may serve as an input into statistical machine learning models to classify for sensitive data, entity inventories, and many other use cases.

Embodiments involve a data "pipeline" in which each step along the pipeline may apply specific NLP/Statistical or data techniques with the objective of preparing the data input set for the next step. The pipeline components may be de-coupled, recombined in different orders, etc. depending upon the input data or the specific use case.

Figure 1:
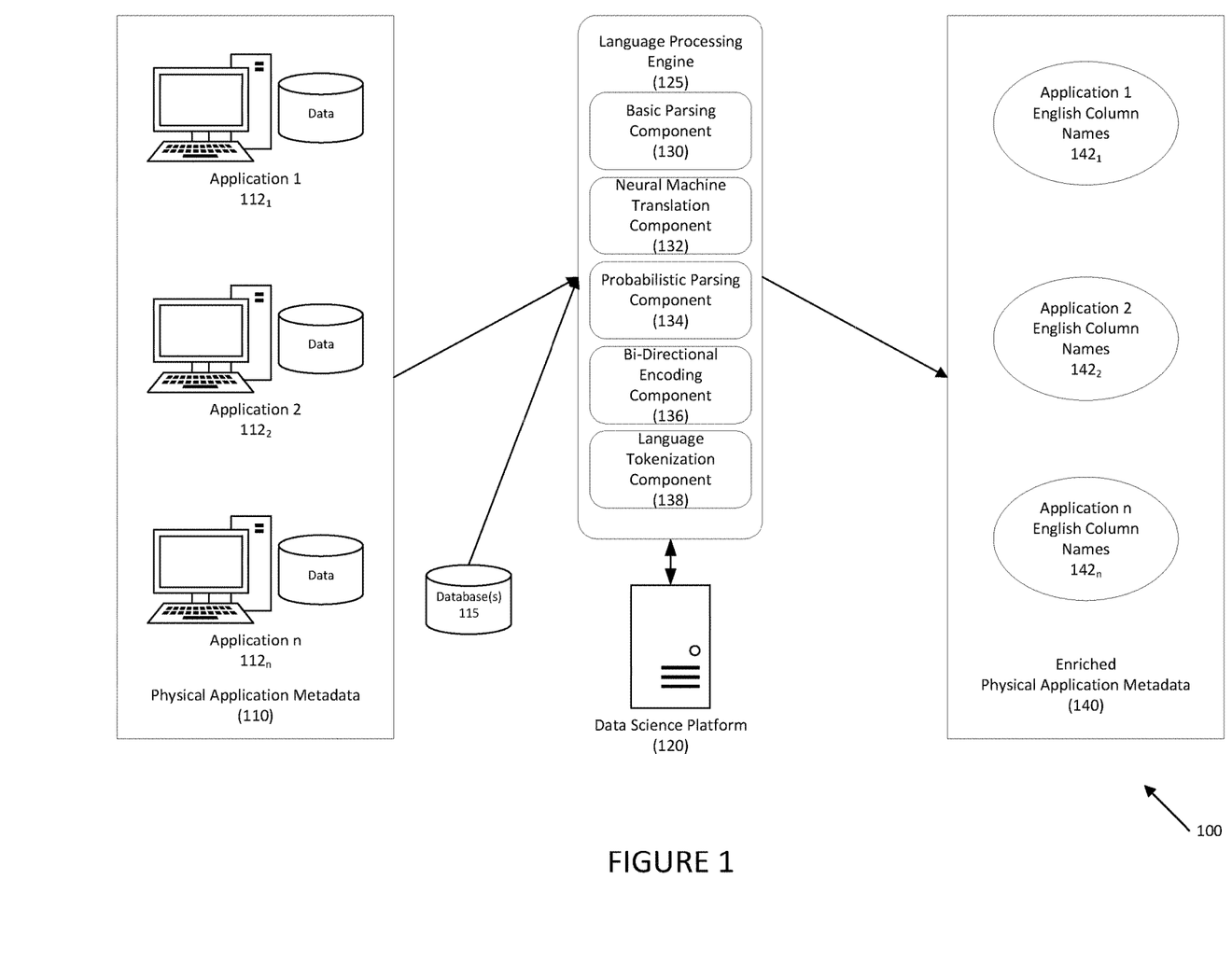
FIG. 1 depicts a system for generalized structured data discovery utilizing contextual metadata disambiguation via machine learning techniques according to one embodiment.

Referring to FIG. 1, a system for generalized structured data discovery utilizing contextual metadata disambiguation via machine learning techniques is disclosed according to one embodiment. System 100 may include physical application metadata 110 from a plurality of applications 112 (e.g., application 1 $112_1$, application 2 $112_2$, application n $112_n$, etc. Applications 112 may include computer applications, databases, cloud spreadsheets, etc. Any suitable source of metadata may be used as is necessary and/or desired.

Physical application metadata 110 may be provided to language processing engine 125 that may be executed by data science platform server 120. Language processing engine 125 may include, for example, basic parsing component 130, neural machine translation component 132, probabilistic parsing component 134, bi-directional encoding component 136, and language tokenization component 138.

In one embodiment, reference data, such as lists of abbreviations, terms, etc. may be provided from application 112, other data sources (e.g., databases), etc. For example, the reference data may serve as a glossary for some terms and abbreviations.

In one embodiment, one or more organizational database 115 may store reference data.

Data from language processing engine 125 may be output as enriched physical application metadata including, for example, application 1 English column names $142_1$, application 2 English column names $142_2$, application n English column names $142_n$, etc.

For example, physical application metadata 110 for an application may include a column named "CASERECEIVEDYTDCOUNT." After being processed by natural language processing engine 125, enhanced physical application metadata 140 for this column name may become "CASE RECEIVED YEAR TO DATE COUNT." As another example, "12mo_Total_Delq_V" may become "12 MONTHS TOTAL DELINQUENCY VIEW." "ACCTNBR," "Acct_NBR," and "0_acct_No" may all become "ACCOUNT NUMBER."

In one embodiment, the processing (e.g., normalization/standardization) at scale automatically, taking hundreds of permutations and combinations. For example, there may be all CAPS without Delimiter, Camel Case with delimiters, Upper and Lower case with and without delimiters along with abbreviations, etc. The language component tries to solve all these combinations across all the applications in an enterprise.

Although embodiments may refer to "Englishifiction" or "Englishify," it should be recognized that any suitable language and/or dialect may be used as a base language as is necessary and/or desired.

Figure 2:
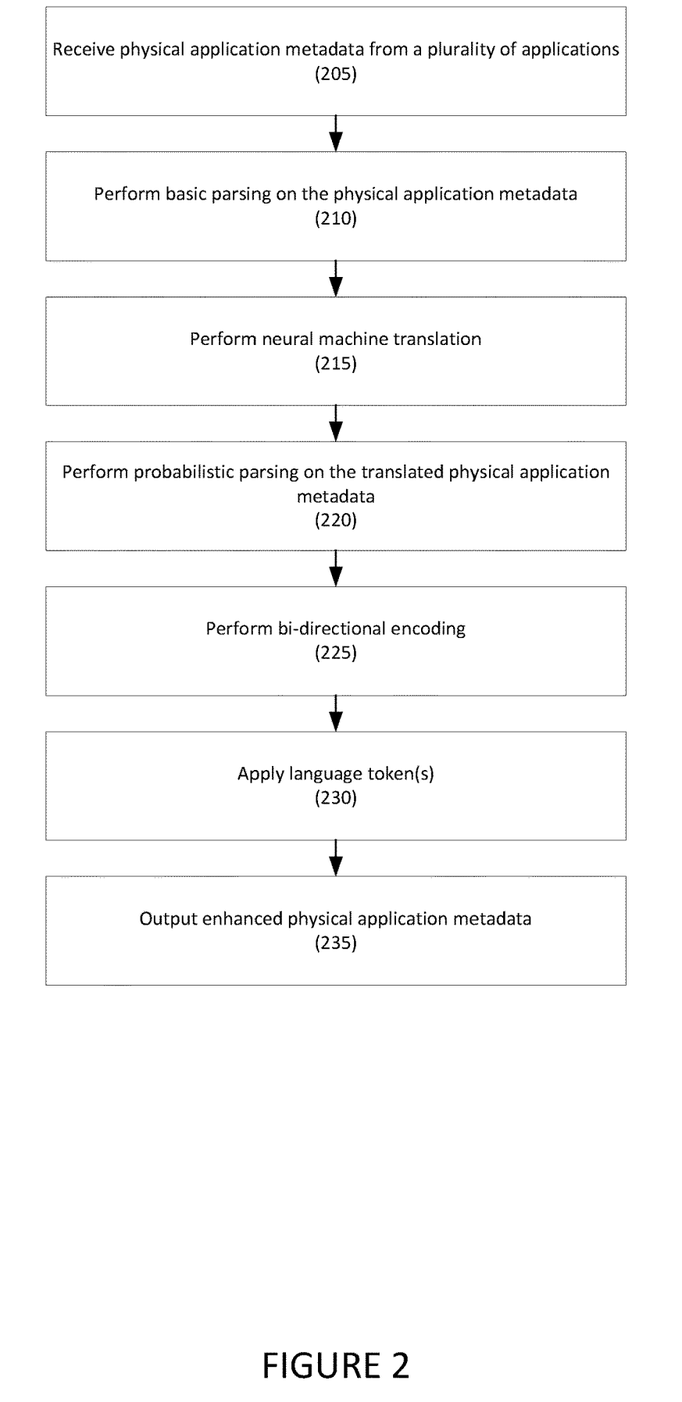
FIG. 2 illustrates a method for generalized structured data discovery utilizing contextual metadata disambiguation via machine learning techniques according to one embodiment.

Referring to FIG. 2, a method for generalized structured data discovery utilizing contextual metadata disambiguation via machine learning techniques is disclosed according to one embodiment.

In step 205, a language processing engine may receive physical application metadata for databases, database objects, etc., such as labels and business tokens and/or abbreviations from a plurality of applications. For example, the physical application metadata may include data labels that may be used by the application. In one embodiment, the metadata may be column names for spreadsheets.

In one embodiment, the metadata may preferably come from a plurality of diverse sources, such as databases, cloud spreadsheets, applications, etc.

In embodiments, an application may be large enough that the process may be run on the single application. For example, the process may run on a large divisional data warehouse with millions of attributes. In general, however, better results may be achieved with a larger number of knowledge in the form of tokens and abbreviation expansions.

In one embodiment, the applications may be sourced from within a single organization.

In embodiment, the language used by an organization may be a mix of standard English (American and international) or other languages, industry-specific abbreviations and terms, and organization-specific abbreviations and terms.

In one embodiment, the metadata may be received in any format and/or language. In one embodiment, metadata that is in a language other than English (or any other default language) may be translated during processing, discussed below.

In one embodiment, the physical application metadata may be cleansed and/or de-duplicated. The physical application metadata may be used to populate a flat table representing the physical application metadata from a plurality of applications.

In one embodiment, the corpus/list of collected business tokens and associated abbreviations may also be cleansed and de-duplicated. In one embodiment, a list of tokens and business expansions may be collected from units within the organization (e.g., lines of businesses, or LOBs). The list may include duplicate tokens but different expansions based upon the usage in the respective LOBs. In essence, the list of tokens and expansions represent the organization's language.

In one embodiment, the originating LOB for the token may be tracked.

In embodiments, a token may be used to represent multiple values. For example, "EQ" may expand to "EQUITY" in some cases, and to "EQUAL" in others. Thus, in embodiments, logic may be applied to choose the best match based on context. For example, in the term "EQ_TRD", "EQ" most likely expands to "EQUITY." In other instances, the token that is most likely (e.g., more commonly used) may be selected. The logic that is used to expand "EQ" is part of the bi-directional encoding process, described in detail in step 225.

In step 210, the language processing engine may perform basic parsing on the physical application metadata. In embodiments, the physical application metadata labels may be normalized by eliminating any special characters and removing the stop words (e.g., "is", "of", "and", etc.). Embodiments may further break apart labels at common known delimiters like "_", "-", etc. For example, "Account_Number" may become "Account Number."

Embodiments may further compare the list of words for each supported language and return the list of tokens/words that are not recognized and will require additional processing in the next component.

In one embodiment, a corpus, such as NLTK English Corpus, and organizational tokens may be used as the look-up dictionary to determine whether to proceed to the next step in the processing engine. For example, if the basic parsing has converted the term into Account Number and as this Account Number is an English word in the look-up dictionary, it would not proceed to next step. For example, the term "ACCTCHG" will go on to the next step because it is still not an English word.

As used herein, a "token phrase" is the collection of tokens, or words, that were parsed and expanded from a physical column or table label. For example, a physical column name like ACCTNUM may expand to a "token phrase" of ACCOUNT NUMBER The output of this step is a set of token phrases that contain either known tokens or unknown tokens.

Unknown tokens are sent to the next step in the pipeline for further processing.

In step 215, neural machine translation may be performed. In one embodiment, this component algorithmically identifies whether a particular token/word input is a non-English word and then translates it into English word as necessary. In one embodiment, tokens/words may be translated to other languages as necessary and/or desired.

In step 220, the language processing engine may perform probabilistic parsing on the physical application metadata. In embodiments, this step takes the tokens from step 215 and determines if they can be parsed further. The key input for this is a corpus of common English tokens along with organization and business specific words and acronyms. In general, it is not sufficient to simply use common English language dictionaries; business specific words are important the accuracy of the expansions.

In embodiments, using a recursive dynamic programming based statistical model, a "cost vector" may be built based on the length of the input token, the number of characters (including the digits count, if any) in the word. The minimal cost may be determined by comparing each character with the words in the corpus.

In embodiments, the words in the corpus are important for the probabilistic splitting of an ambiguous token as the corpus may be customized for each business domain. For example, different corpuses can be dynamically substituted for different business groups to further drive accuracy.

The output of this step creates a higher percentage of tokens that are real words in the business corpus, although there may be tokens that do not match. These token mismatches may be acronyms and abbreviations used in the organization, business words not in the corpus, terms that cannot be understood. The mismatches are provided to the step 225.

The output of the step 220 may be a set of individual, fine-tuned token phrases. For example, the column label CASERECEIVEDYTDAMOUNT may be expanded to "CASE RECEIVED YTD AMOUNT" along with tokens that could have single expansion to multiple expansions. In this example, the token "YTD" requires additional processing.

The token "YTD" may be a "monosemous" token (i.e., one to one token expansion) or a "polysemous" token (i.e., not one-to-one token expansion). The language processing engine may determine whether a token is a monosemous token or a polysemous token by referring to a look-up dictionary. For example, a corpus, such as NLTK English Corpus, and organizational tokens, and any other suitable sources may be used as the look-up dictionary, along with LOB-specific language represented as tokens and its expansions.

If the algorithm determines that a specific token input is a monosemous token, then language engine may use highly-optimized and scalable logic to search, find and replace the monosemous tokens at scale. For example, if there is only one expansion for YTD to Year to Date in the corpus, then the algorithm may be applied to find and replace the YTD to Year to Date. So, the example of CASERECEIVEDYTDA-MOUNT may be expanded finally to "CASE RECEIVED YEAR TO DATE AMOUNT."

If there are any polysemous tokens, the process proceeds to step 225.

In step 225, bi-directional encoding may be performed. For example, the language processing engine may perform contextual abbreviation/acronym expansion on any polysemous tokens. An example of a polysemous token is "CE," as CE can be expanded to Credit Executive, Credit Exposure, Current Exposure, etc.

In embodiments, a customized corpus of organizational abbreviations and related expansion and/or text describing the owning application to provide business context may be leveraged to identify the unknown tokens.

In one embodiment, the Sentence Bidirectional Encoder Representations ("sBERT") technique may be used with pre-trained vector(s) from the sBERT to probabilistically select the right token expansion based upon the context if the token is polysemous token. The process to capture the context is with the help of encoders by first defining the left side context with a set of features and then we compare it with right-side context for the token and its expansion. Cosine similarity after encoding the vectors may be used, and the tokens may be ranked according to their cosine similarity score may be presented for the final selection.

For example, the token "CE" may be parsed from a physical column curr_total_ce. The CE token could mean "CREDIT EXPOSURE" or "CLIENT EXECUTIVE." sBERT compares the application description phrase sourced from the organization's application master database—"This application processes credit disputes and provides decisioning on the dispute charged." sBERT thus determines that the expansion "CREDIT EXPOSURE" has more in common with the phrase than "CREDIT EXECUTIVE." If, on the other hand, the application description had been "EPIC is an Employee productivity, quality, and time off tracking tool for the credit area," then sBERT would have noticed that EXECUTIVE and EMPLOYEE was a better match and would have weighted the CREDIT EXECUTIVE expansion higher.

In step 230, language token(s) may be applied. In one embodiment, sBERT may be used as framework to process ambiguous tokens by taking into account input features like application or business descriptions. In essence, the English phrase is presented on one side, and an application description on the other side.

To disambiguate, a "Left" and "Right" side encoding/context model may be used. The left side may be built with metadata, such as application description, line of business identifiers, table names, schema names, and other columns labels in the table along which have been expanded in the previous steps. The right side may hold the list ambiguous abbreviations and potential expansions.

The contextual expansion of the abbreviation "ACCT," which may be "Accounting" or "Account."

For the right-side context, application XYZ may be a demand deposit account-reporting application with an objective to collect the data from up-stream systems to create the reports for the business managers in the finance team. The Table ABC metadata is Column A, Column B, Column C, Column D, ACCT NBR.

Application ABC may be a financial Accounting System capturing the accounting treatments for the expenses as per the FASB standards Corporate. The Table DEF metadata includes Column A, Column B, Column C, Column D, ACCT NBR.

The left side context is as follows: ACCT Accounting Corporate, ACCT Account Retail.

Using bi-directional text embedding with vectorization, the left side context may be encoded into a "word embedding" by building a sentence transformer. The algorithm automatically detects whether there exist multiple expansions in a same column, and may automatically create multiple rows to convert it into the sentence transformers.

The right-side context also may be converted into an embedding using a sentence transformer.

The transformer from the left side may be queried with the right-side transformer, and a distance metric may be used to compute the similarity. The algorithm may be coded with Euclidean and cosine similarity.

Each expansion may be scored based upon the sentence transformers comparisons. For example, token ACCT could probably mean 'ACCOUNT' for application XYZ, but 'ACCOUNTING' for application ABC.

A non-limiting example is as follows. Tokens and expansions may be collected from each LOB and used as the source of truth for the probabilistic token expansions if the token is Polysemous token. For example, CE is a token that may have four different expansions—Credit Exposure, Current Exposure, Credit Executive and Client Executive. The occurrence of CE may be probabilistically expanded to any of the four expansions based upon its occurrence in each application. For example, CE in Application 123 and Table XYZ could mean Current Exposure and the same CE in Application 456 and Table XYZ could mean Client Executive. The probabilistic scoring for each CE occurrence in each application is assigned based upon its context and relevance.

The highest scored token/abbreviation and its expansion may be selected. In the Table 1 below, there is an application with a table called securities and the columns are below. The first highest scored expansion is considered in order to deliver it to the user for the feedback. This is depicted in Table 1, below:

TABLE I

| Physical_Column | Token_To_Expand | Recommended_Expansion_BERT | Score_BERT |
|---|---|---|---|
| isin | isin | internatinoal securities indentification number | 0.53 |
| curr_natural_ce | ce | credit exposure | 0.49 |
| curr_natural_ce | ce | credit executive | 0.44 |
| curr_natural_ce | ce | client executive | 0.34 |
| curr_natural_ce | ce | current exposure | 0.30 |
| curr_total_ce | ce | credit exposure | 0.50 |
| curr_total_ce | ce | credit executive | 0.46 |
| curr_total_ce | ce | client executive | 0.35 |
| curr_total_ce | ce | current exposure | 0.30 |
| cusip | cusip | committee for uniform securites identification procedures | 0.59 |
| wac | wac | weighted average coupon | 0.49 |
| wac | wac | wire authorization code | 0.36 |
| wac | wac | wieghted average cost | 0.35 |
| des | des | description | 0.48 |
| des | des | data encryption standard | 0.42 |
| des | des | digital evolution strategy | 0.41 |

The process/components may be iterated multiple times internally in the algorithm to ensure the given input text have been fine-tuned and processed to an English word with very few abbreviations or ambiguous tokens where the business domain input is required.

In step 235, enhanced physical application metadata may be output. In one embodiment, a table with a mapping between the physical application metadata and the enhanced physical application metadata may be provided. In another embodiment, the physical application metadata may be replaced with the enhanced physical application metadata EXAMPLE. A non-limiting example is as follows. Physical application metadata is collected from multiple applications, including column names such as "ACCOUNTNUMBER" and "ACCTNBR."

Next, basic parsing is performed. "ACCOUNTNUVIBER" is parsed to become "Account Number." "ACCTNBR" cannot be parsed.

Next, neural machine translation is performed. It searches for the non-English phrases and translates it into English phrase automatically and at scale. "Regra" in Portuguese can stand for "Rule" in English.

Next, "probabilistic splitting" of composite tokens into individual tokens is performed. "ACCTNBR" may be parsed to "ACCT" "NBR" even though there are no clear delimiters. "ACCT" and "NBR" are not clean English words, and are therefore further processed in the next step.

Next, bi-directional encoders are applied to contextually expand the tokens to its relevant expansions at each occurrence.

For example, the output is a human readable English name for the physical application metadata. Table 2, below, is an example of the final output of the algorithm matching the original intention of the human developer/data modeler.

TABLE 2

| Raw Text/Physical Column Name | Clean Column Name |
|---|---|
| ACCT_NBR | ACCOUNT NUMBER |
| CASERECEIVEDYTDCOUNT | CASE RECEIVED YEAR TO DATE COUNT |
| 12mo_Total_Delq_V | 12 MONTH TOTAL DELINQUENCY VIEW |

Although several embodiments have been disclosed, it should be recognized that these embodiments are not mutually exclusive and features from one may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for generalized structured data discovery utilizing contextual metadata disambiguation via machine learning techniques, comprising:
    in an information processing apparatus comprising at least one computer processor:
        receiving physical application metadata from one or more data sources for an attribute, a database object, or a database;
        receiving reference data comprising a plurality of tokens and their associated abbreviations and acronyms;
        parsing the physical application metadata into a plurality of application tokens comprising known application tokens and unknown application tokens;
        identifying unknown application tokens by comparing the parsed application tokens to a corpus;
        performing probabilistic parsing on the unknown application tokens using the reference data;
        performing bi-directional encoding on polysemous unknown application tokens to expand the polysemous tokens to relevant expressions using the reference data;
        applying language tokens to the relevant expressions in the expanded polysemous tokens to disambiguate the relevant expressions; and
        outputting a mapping of the physical application metadata to enhanced physical application metadata, wherein the enhanced physical application metadata comprises an expression for the physical application metadata in a supported language.

2. The method of claim 1, further comprising:
    performing neural machine translation on unknown application tokens in an unsupported language to translate the unknown application tokens to the supported language.

3. The method of claim 1, wherein the metadata is received from a plurality of data sources.

4. The method of claim 1, wherein the parsing performs at least one of the following: (1) eliminates special characters; and (2) removes stop words.

5. The method of claim 1, wherein the parsing is based on common delimiters.

6. The method of claim 1, wherein the corpus comprises a dictionary for the supported language.

7. The method of claim 1, wherein the corpus comprises the reference data.

8. The method of claim 1, wherein the reference data comprises common industry and organization terms.

9. The method of claim 1, wherein the language tokens are applied to the relevant expressions in the expanded polysemous tokens using a left and right-side encoding/context model.

10. A system for generalized structured data discovery utilizing contextual metadata disambiguation via machine learning techniques, comprising:
    a plurality of data sources of physical application metadata for an attribute, a database object, or a database;
    at least one organizational database comprising reference data comprising a plurality of tokens and their associated abbreviations and acronyms; and
    a language processing engine comprising at least one computer processor in communication with the plurality of data sources;
    wherein:
        the language processing engine receives the physical application metadata from the data sources;
        the language processing engine receives the reference data from the organizational database;
        the language processing engine parses the physical application metadata into a plurality of application tokens comprising known application tokens and unknown application tokens;
        the language processing engine identifies unknown application tokens by comparing the parsed application tokens to a corpus;
        the language processing engine performs probabilistic parsing on the unknown application tokens using the reference data;
        the language processing engine performs bi-directional encoding on polysemous unknown application tokens to expand the polysemous tokens to relevant expressions using the reference data;

the language processing engine applies language tokens to the relevant expressions in the expanded polysemous tokens to disambiguate the relevant expressions; and the language processing engine outputs a mapping of the physical application metadata to enhanced physical application metadata, wherein the enhanced physical application metadata comprises an expression for the physical application metadata in a supported language.

11. The system of claim 10, wherein the language processing engine further performs neural machine translation on unknown application tokens in an unsupported language to translate the unknown application tokens to the supported language.

12. The system of claim 10, wherein the metadata is received from a plurality of data sources.

13. The system of claim 10, wherein the parsing performs at least one of the following: (1) eliminates special characters; and (2) removes stop words.

14. The system of claim 10, wherein the parsing is based on common delimiters.

15. The system of claim 10, wherein the corpus comprises a dictionary for the supported language.

16. The system of claim 10, wherein the corpus comprises the reference data.

17. The system of claim 10, wherein the reference data comprises common industry and organization terms.

18. The system of claim 10, wherein the language tokens are applied to the relevant expressions in the expanded polysemous tokens using a left and right-side encoding/context model.

* * * * *